United States Patent [19]

Ballman et al.

[11] 4,108,970

[45] Aug. 22, 1978

[54] PROCESS FOR PRODUCING LITHIUM NIOBATE AND LITHIUM TANTALATE

[75] Inventors: Albert Anthony Ballman, Woodbridge; Murray Robbins, Berkeley Heights, both of N.J.

[73] Assignee: Bell Telephone Laboratories, Incorporated, Murray Hill, N.J.

[21] Appl. No.: 707,718

[22] Filed: Jul. 21, 1976

[51] Int. Cl.² ............... C01G 33/00; C01G 35/00; C01D 15/00
[52] U.S. Cl. .................................................. 423/593
[58] Field of Search ........................................ 423/593

[56] References Cited

U.S. PATENT DOCUMENTS

| 3,330,697 | 7/1967 | Pachini | 423/593 |
| 3,699,044 | 10/1972 | Dosch et al. | 423/593 |

FOREIGN PATENT DOCUMENTS

| 286,834 | 1/1966 | Australia | 423/593 |
| 1,212,347 | 11/1970 | United Kingdom | 423/593 |
| 1,122,380 | 7/1968 | United Kingdom | 423/593 |

*Primary Examiner*—Herbert T. Carter
*Attorney, Agent, or Firm*—Walter G. Nilsen

[57] ABSTRACT

A process is described for producing fine particles of certain double oxide compounds. This procedure is advantageous because of the fine particles produced and the accurate stoichiometry of the resulting product. The process is particularly applicable to the production of such compounds as $LiNbO_3$ and $LiTaO_3$ and other compounds where conventional procedures involving heating a mixture of individual oxides leads to stoichiometry problems because of the volatility of one of the component oxides.

4 Claims, No Drawings

PROCESS FOR PRODUCING LITHIUM NIOBATE AND LITHIUM TANTALATE

BACKGROUND OF THE INVENTION

1. Field of the Invention

The invention is a process for producing double-oxide compounds such as lithium niobate and lithium tantalate.

2. Description of the Prior Art

Double oxides such as lithium niobate and lithium tantalate are usually produced by mixing the individual single oxides together ($Li_2O$ and $Nb_2O_5$ for $LiNbO_3$) and heating to a temperature where these individual oxides react to form the double oxide. Although care is often taken to insure good mixing of the individual oxides, exact stoichiometry is often not obtained. In addition, certain single oxides may be lost through volatilization which also disturbs the stoichiometry of the double oxide. For many applications exact stoichiometry is particularly important. Also extremely fine and reasonably uniform particle size is advantageous in the production of devices employing double oxide compounds. This is particularly true in the fabrication of melt phase epitaxial films where small particle size and uniform particle size permit growth of smooth films.

SUMMARY OF THE INVENTION

The invention is a procedure for making extremely fine, uniform particles of double-oxide compounds using a coprecipitation procedure. In broad terms, the process involves dissolving suitable compounds of the two cations which form the double-oxide to be made (lithium and niobium for lithium niobate) in an organic solvent and adding this solution to a second solution which forms a hydroxide of the double oxide. Subsequent heating of this hydroxide yields the double oxide. Exact stoichiometry is obtained possibly because the hydroxide formed involves both cations. In addition, particle size is small (usually less than 1000 Angstroms) and highly uniform which makes this material particularly suitable for use in forming melt phase epitaxial layers.

DETAILED DESCRIPTION

1. The Solute-Solvent System

For convenience, the procedure is described for making lithium niobate although identical procedures may be used by other double oxide compounds such as lithium tantalate. The initial step in the process is making a suitable solution of lithium compound and niobium compound. The lithium compound may be an alkoxy compound such as lithium methoxide or lithium ethoxide. The lithium methoxide is preferred because of greater availability. The niobium compound may also be an alkoxy compound such as niobium methoxide or niobium ethoxide. The methoxide is preferred because of greater availability. A niobium halide may also be used such as niobium pentachloride. The fluoride and bromide may also be used, but the iodide may be too unstable.

The solvent system is made up of certain alcohol compounds. Methanol or ethanol may be used alone or as a mixture. Methanol is preferred because the greater solubility of the compounds in this alcohol minimizes the amount of solution used. Mixtures of methanol or ethanol and other alcohols may also be used. Generally alcohols with more than 10 carbons, although useful, are inconvenient because of limited availability. Solutions with approximately half methanol or ethanol and half propanol (such as 2-propanol) or butanol yield particularly good results.

The solution is made by adding equimolar amounts of lithium compound and niobium compound to the solvent. Although various concentrations may be used, it is convenient to minimize the amount of solution by using essentially saturated solutions of the lithium and niobium compounds. Also, minimization of the amount of solvent increases product yield because the coprecipitated hydroxide is soluble in methanol and to a certain extent ethanol.

2. The Coprecipitation Procedure

The solution described above is coprecipitated under conditions which lead to the formation of a lithium niobium hydroxide. This is done by adding the solution described above to an alcohol-base solution. This alcohol-base solution is made up of two parts which will be labeled Part A and Part B. Part A is an alcohol in which water has a reasonable solubility but in which the lithium and niobium compounds are essentially insoluble. Most useful are alcohols with 3 or 4 carbon atoms. Generally 2-propanol is used because of its availability. Part B is an aqueous solution of an organic base or ammonium base. Generally a saturated solution is used to minimize the amount of water present in the alcohol-base solution. Also, it is advantageous that the organic base have a reasonable solubility in water. Aqueous ammonia as well as aqueous solutions of quaternary ammonium salts are particularly convenient. Organic amines with up to 10 carbon atoms may be used as well as heterocyclic nitrogen basic compounds such as piperidine, pyridine and other related compounds.

Generally only enough basic solution is added to the coprecipitation solution to form the hydroxide. Excess base solution up to approximately 20 mole percent may be used to insure complete conversion to the hydroxide compound. Too much base solution should be avoided because of the excessive amount of water added to the solution.

The mixed lithium-niobium solution is then added slowly to the base solution with stirring. Dropwise addition is generally preferred to insure excess hydroxide is always available to react with both the lithium and niobium compounds. This insures that both lithium and niobium are converted into the hydroxide together. The resulting precipitate is filtered, dried and then heated generally to about 500°–800° C for conversion to the oxide. Although temperatures above 800° C may be used, it might volatilize some components such as lithium compounds which would adversely effect stoichiometry. Below 500° C, excessively long times are required to insure complete conversion to the double oxide. The drying procedure is often carried out above room temperature, say at approximately 100° C.

The compound $LiTaO_3$ is made by the same procedure with suitable changes in starting material. The same lithium compounds are used for $LiTaO_3$. Any organic tantalum compound soluble in the solvent may be used such as tantalum alkoxide compounds. Tantalum pentamethoxide and tantalum pentaethoxide are examples with the pentaethoxide preferred because of ready availability. Tantalum halides, such as $TaCl_5$, $TaBr_5$ and $TaI_5$ are also used. The compound $TaF_5$ may also be used but its low solubility limits its usefulness.

3. Characterization of the Product

The double oxide compounds produced by this procedure are unique in at least two respects. First, the product is highly stoichiometric in that the double oxide is formed without the presence of significant amounts of single-oxide compound. This is of great importance in device applications because crystal imperfections caused by vacancies or altered crystalline structure due to off-stoichiometry have adverse effects on the optical acoustic and electric properties of the material. High stoichiometry is indicated not only by these properties but also by narrow, sharp X-ray diffraction lines.

Second, the particle size is much smaller and more uniform in double oxides prepared in accordance with the inventive process. Double oxides are prepared using the described procedure where particle size of 90 percent (by weight) of the material is less than 1000 Angstroms. Where conversion from the hydroxide to the double oxide takes place at about 800° C ($\pm$50° C), it is found that 90 percent by weight of the double oxide has particle size between 500 and 1000 Angstroms. Where this conversion takes place at 500° C ($\pm$50° C), the particle size of 90 percent by weight of the double oxide is between 250 and 500 Angstroms. Such small particle size is greatly advantageous in forming devices using these double oxides, particularly epitaxial layers of these double oxides.

Although the exact mechanism for the formation of the double oxide is not known with certainty, it is believed that a mixed hydroxide is formed first, possibly with the formula $LiNb(OH)_6$ and this is converted directly to the double oxide without any single oxide ($Li_2O$, $Nb_2O_5$) forming.

What is claimed is:

1. A process for synthesizing double oxide compounds with nominal formula $LiMO_3$ in which M is selected from the group consisting of niobium and tantalum, comprising the steps of
   (a) dissolving suitable lithium compound selected from the group consisting of lithium methoxide and lithium ethoxide and M compounds selected from the group consisting of M methoxide, M ethoxide, M pentafluoride, M pentachloride and M pentabromide in an organic solvent consisting essentially of at least one alcohol selected from the group consisting of ethanol and methanol, said lithium and M compounds dissolved in an organic solvent in approximately equally molar amounts,
   (b) adding this solution to an alcohol-base solution consisting essentially of at least one alcohol with 3 or 4 carbon atoms and at least one basic compound selected from the group consisting of ammonia, quaternary ammonium salts, organic amines with up to 10 carbon atoms and heterocyclic nitrogen basic compounds said addition resulting in coprecipitate mixed hydroxide compound,
   (c) separating and drying the resulting coprecipitate mixed hydroxide compound,
   (d) heating the separated and dried coprecipitate to a temperature between 500° and 800° C so as to convert the hydroxide compound to the double oxide compound.

2. The process of claim 1 in which the suitable lithium compound is lithium methoxide.

3. The process of claim 2 in which the M compound is selected from the group consisting of M methoxide and M ethoxide.

4. The process of claim 1 in which the M compound is selected from the group consisting of M pentafluoride, M pentachloride and M pentabromide.

* * * * *